US006362604B1

(12) United States Patent
Cravey

(10) Patent No.: US 6,362,604 B1
(45) Date of Patent: Mar. 26, 2002

(54) ELECTROSTATIC PRECIPITATOR SLOW PULSE GENERATING CIRCUIT

(75) Inventor: William Ray Cravey, Albuquerque, NM (US)

(73) Assignee: Alpha-Omega Power Technologies, L.L.C., Albuquerque, NM (US)

(*) Notice: Subject to any disclaimer, the term of this patent is extended or adjusted under 35 U.S.C. 154(b) by 0 days.

(21) Appl. No.: 09/406,507

(22) Filed: Sep. 28, 1999

Related U.S. Application Data

(60) Provisional application No. 60/102,173, filed on Sep. 28, 1998.

(51) Int. Cl.[7] .......................... G05F 1/10; H02M 7/155

(52) U.S. Cl. ........................ 323/241; 323/903; 363/128

(58) Field of Search ................................ 323/241, 242, 323/246, 271, 282, 284, 249, 240, 903; 363/98, 128, 132, 48

(56) References Cited

U.S. PATENT DOCUMENTS

| | | | | |
|---|---|---|---|---|
| 2,509,548 A | | 5/1950 | White | |
| 4,061,961 A | | 12/1977 | Baker | |
| 4,290,003 A | | 9/1981 | Lanese | |
| 4,541,848 A | | 9/1985 | Masuda | |
| 4,558,404 A | | 12/1985 | James | |
| 4,567,541 A | | 1/1986 | Terai | |
| 4,587,475 A | | 5/1986 | Finney, Jr. et al. | |
| 4,592,763 A | | 6/1986 | Dietz et al. | |
| 4,600,411 A | | 7/1986 | Santamaria | |
| 4,626,261 A | | 12/1986 | Jorgensen | |
| 4,808,200 A | | 2/1989 | Dellhammer et al. | |
| 4,867,765 A | | 9/1989 | Tomimatsu et al. | |
| 4,996,471 A | | 2/1991 | Gallo | |
| 5,623,171 A | * | 4/1997 | Nakajima | 323/247 |
| 5,639,294 A | | 6/1997 | Ranstad | |
| 5,757,169 A | * | 5/1998 | Terai | 323/241 |
| 5,903,450 A | | 5/1999 | Johnson et al. | |

OTHER PUBLICATIONS

*Clear Stacks,* Jul., 1997, pp. 1, 4–5, Reinhold Environmental Ltd. No Date.

* cited by examiner

*Primary Examiner*—Rajnikant B. Patel
(74) *Attorney, Agent, or Firm*—Andrea L. Mays

(57) ABSTRACT

An apparatus and method for generating slow rise-time, high voltage electrical pulses to a load, preferably using an existing transformer/rectifier set or power supply to charge an inversion or high voltage switching circuit to produce the pulsed voltage. An energy recovery circuit (100, 102) is used to return unused energy from the load (24) back to the means for producing pulsed voltage (110, 130). A load matching circuit (120) uses a blocking diode and a capacitor for charging the load. An additional blocking diode (32) inhibits load voltage discharge back through the slow pulse generating circuit. A transformer (20) can be used to step-up voltage from the inversion circuit, or high voltage switching circuit, to the load. One or more magnetic switch stages are used to transfer energy from the inversion circuit, or high voltage switching circuit, to the load matching circuit. A fire-on voltage controller (66) triggers the inversion or high voltage switching circuit.

29 Claims, 10 Drawing Sheets

ELECTROSTATIC PRECIPITATOR SLOW PULSE GENERATING CIRCUIT

CROSS-REFERENCE TO RELATED APPLICATIONS

This application claims the benefit of the filing of U.S. Provisional Patent Application Ser. No. 60/102,173, entitled Electrostatic Precipitator Slow Pulse Generating Circuit, filed on Sep. 28, 1998, and the specification thereof is incorporated herein by reference.

BACKGROUND OF THE INVENTION

1. Field of the Invention (Technical Field)

The present invention relates to circuits for generating high voltage electrical pulses.

2. Background Art

With the thrust to maintain a clean environment, the need for better particulate control in industrial processes is needed. Electrostatic precipitators are one of the most widely used methods of collecting particulate matter in flue gas systems. In general, the systems are comprised of sets of collecting plates which are usually at ground potential, high voltage electrodes, and a set of power supplies which delivers the high voltage to the electrodes. The high voltage electrode is made up of either a thin wire running the length of the collecting plates or a rigid electrode.

The majority of the power supplies for the systems are made up of transformer/rectifier (T/R) sets. The T/R sets provide unfiltered, rectified high voltage (40 kV–80 kV) DC to the electrodes. It has been shown that better collection efficiency can be achieved by applying a voltage pulse (also known as pulsed energization) to the electrostatic precipitator instead of the unfiltered DC.

The idea of pulsed energization for the electrostatic precipitator (ESP) process is not new and has been studied extensively. The earliest work was performed by R. Heinrich in the 1920's. Heinrich applied radar modulator technology that was being developed for World War II. Heinrich worked with Harry White and Herb Hall at the MIT Radiation Laboratory. Later in 1952 the first full scale tests were conducted by White and Hall when they applied pulsed voltages with 50 microsecond rise-times to wire-plate ESPs using rotary spark gaps or hydrogen thyratrons, pulse transformers and blocking diodes. Improved efficiency was observed for the tests.

Masuda of Japan furthered pulsing technology in 1976 by applying a pulse to a DC bias. The bias allowed the use of halo-wave AC for corona creation. This system operated primarily as a pre-charger to a conventional ESP. In the United States numerous systems have been investigated over the years with limited success due to overall system costs and reliability.

Prior art patents that disclose related technology, however different from the present invention, include: U.S. Pat. No. 5,623,171, to Nakajima, entitled "High Voltage Pulse Generating Circuit and Electrostatic Precipitator Containing It;" U.S. Pat. No. 4,808,200, to Dallhammer et al., entitled "Electrostatic Precipitator Power Supply;" U.S. Pat. No. 4,558,404, to James, entitled "Electrostatic Precipitators;" U.S. Pat. No. 4,867,765, to Tomimatsu et al., entitled "Self-Discharge Type Pulse Charging Electrostatic Precipitator;" U.S. Pat. No. 4,600,411, to Santamaria, entitled "Pulsed Power Supply for an Electrostatic Precipitator;" U.S. Pat. No. 4,592,763, to Dietz et al., entitled "Method and Apparatus for Ramped Pulsed Burst Powering of Electrostatic Precipitators;" U.S. Pat. No. 2,509,548, to White, entitled "Energizing Electrical Precipitator;" U.S. Pat. No. 5,903,450, to Johnson et al., entitled "Electrostatic Precipitator Power Supply Circuit Having a T-Filter and Pi-Filter;" U.S. Pat. No. 5,757,169, to Terai, entitled "Electric Circuit for Pulse Energized Electrostatic Precipitator and Pulse Energized Electrostatic Precipitator Using This Circuit;" U.S. Pat. No. 5,639,294, to Ranstad, entitled "Method for Controlling the Power Supply to an Electrostatic Precipitator;" U.S. Pat. No. 4,996,471, to Gallo, entitled "Controller for an Electrostatic Precipitator;" U.S. Pat. No. 4,626,261, to Jorgensen, entitled "Method of Controlling Intermittent Voltage Supply to an Electrostatic Precipitator;" U.S. Pat. No. 4,587,475, to Finney, Jr. et al., entitled "Modulated Power Supply for an Electrostatic Precipitator;" U.S. Pat. No. 4,567,541, to Terai, entitled "Electric Power Source for use in Electrostatic Precipitator;" U.S. Pat. No. 4,541,848, to Masuda, entitled "Pulse Power Supply for Generating Extremely Short Pulse High Voltages;" U.S. Pat. No. 4,290,003, to Lanese, entitled "High Voltage Control of an Electrostatic Precipitator System;" and U.S. Pat. No. 4,061,961, to Baker, entitled "Circuit for Controlling the Duty Cycle of an Electrostatic Precipitator Power Supply."

U.S. Pat. No. 4,558,404, to James, relates to a DC-AC inverter, whereas the present invention utilizes an inversion circuit which inverts polarity. U.S. Pat. No. 4,867,765, to Tomimatsu et al., uses an inductive isolation for the voltage pulse, while other ESP cells are used to bleed down the charge on the ESP. Only one ESP cell is pulsed at a time due to the multi-pole output switch. U.S. Pat. Nos. 4,808,200, to Dallhammer, et al. and 4,567,541, to Terai, both use a voltage pulse which is superimposed on top of a constant DC value, which is not the case in the present invention. U.S. Pat. No. 4,600,411, to Santamaria, uses a pulsed source and a transformer, as well as an LC trap circuit which is quite different from the present invention. U.S. Pat. No. 4,592,763, to Dietz, et al., discusses a pule ramping technique which is not relevant to the present invention. U.S. Pat. No. 2,509,548, to White, discloses the use of a step-up transformer or a MARX arrangement to generate high voltage output. Again, this is different from the present invention. U.S. Pat. No. 5,903,450, to Johnson et al., is an invention for an inductive PI filter on the output of a transformer/rectifier set and is not relevant to the present invention. U.S. Pat. No. 5,757,169, to Terai, discloses an energy recovery technique that is quite different from the present invention. U.S. Pat. No. 5,639,294, to Ranstad, is an invention for a short circuit protection circuit for the electrostatic precipitator. U.S. Pat. Nos. 4,996,471, 4,626,261, 4,290,003, and 4,061,961, all disclose control circuits which are unrelated to the present invention.

The present invention is of a system which improves the efficiency of ESP performance which can be used for high resistivity ash collection. The technology is based on economically converting existing capital equipment such as existing T/R sets to produce optimized power delivery to the ESP load. A power supply can alternatively be used.

Performance improvements are gained through the ability of the system to operate at higher average currents and voltages. It has been shown that if ionization potential is exceeded quickly enough, a uniform corona distribution is obtained. This leads to uniform current distribution and improved ionization of particles. The present invention is different from other pulsed energization schemes discussed earlier because it does not force fast rise-time, <1 microsecond, or square pulse shapes. In fact, the concept provides a moderate pulse rise-time in the range of 1 microsecond to 500 microseconds and then allows the voltage to decay down naturally dependent on the ESP load characteristics.

SUMMARY OF THE INVENTION (DISCLOSURE OF THE INVENTION)

The present invention is of a slow pulse generating circuit for generating slow rise-time, high voltage electrical pulses to a load. The circuit comprises means for producing a pulsed voltage, means for charging the means for producing pulsed voltage, an energy recovery circuit for returning unused energy from the load back to the means for producing the pulsed voltage, a load matching circuit, means for inhibiting load voltage discharge back through the circuit, and means for transferring energy from the means for producing pulsed voltage to the load matching circuit. The circuit can optionally have a transformer for stepping up voltage from the means for producing the pulsed voltage to the load matching circuit. The means for producing the pulsed voltage preferably comprises either an inversion circuit or a high voltage switching circuit. The inversion circuit comprises at least one storage capacitor that is charged by the means for charging, a primary switch that is closed when the at least one storage capacitor becomes charged, and an inductor in series with the primary switch. The high voltage switching circuit comprises a primary switch, an inductor in series with the primary switch, and at least one storage capacitor for triggering the primary switch, and is located in series between the inductor and the at least one magnetic switch stage.

The means for charging the means for producing pulsed voltage preferably comprises a transformer/rectifier set or a power supply. The energy recovery circuit comprises at least one energy recovery diode and an energy recovery inductor in series with the at least one diode, and is located between the transformer/rectifier set (or power supply) and the load matching circuit. The energy recovery circuit also preferably comprises at least one energy recovery storage capacitor at the output of the transformer/rectifier set or power supply, at least one series charge element at the output of the T/R set or power supply—which can be either a series charge resistor or an inductor—and at least one energy recovery diode to recover energy due to voltage reversals occurring in the load matching circuit.

The load matching circuit preferably comprises at least one load matching blocking diode and at least one load matching capacitor for charging the load. The means for inhibiting load voltage discharge preferably comprises at least one blocking diode. The means for transferring energy preferably comprises at least one magnetic switch stage. The at least one magnetic switch stage of the circuit preferably comprises at least one magnetic switch, and at least one capacitor to saturate each of the at least one magnetic switch.

The circuit preferably comprises a fire-on-voltage controller for determining the trigger voltage for the means used to produce the pulsed voltage. In an alternative embodiment, the circuit comprises means for producing pulsed voltage, means for charging the means for producing pulsed voltage, at least one blocking diode to inhibit load voltage discharge back through the circuit, and at least one magnetic switch stage for transferring energy from the means for producing pulsed voltage to the load. The means for producing pulsed voltage preferably comprises at least one storage capacitor to be charged to a preset voltage and a primary switch to be closed when the at least one storage capacitor becomes charged to the preset voltage. In this alternative embodiment, a fire-on voltage controller is preferably used for determining the preset voltage for the storage capacitor and then triggers the primary switch. This embodiment preferably further comprises an inductor in series with the means for producing pulsed voltage and at least one capacitor to transfer energy from the means for producing pulsed voltage to the at least one magnetic switch stage and load.

The present invention is adaptable to existing electrostatic precipitator systems having a high voltage power source, such as a transformer/rectifier set or power supply. The improvement over the existing electrostatic precipitator system comprises means for producing pulsed voltage connected to the power source, energy recovery circuitry for returning unused energy from the electrostatic precipitator back to the means for producing pulsed voltage, a load matching circuit connected between the means for producing pulsed voltage and the electrostatic precipitator, means for inhibiting the electrostatic precipitator load voltage discharge back through the system, and means for transferring energy from the means for producing pulsed voltage to the load matching circuit.

The present invention is also of a method of generating slow rise-time, high voltage electrical pulses to a load and comprises the steps of producing pulsed voltage, transferring energy from the means for producing pulsed voltage to the load with at least one magnetic switch stage, matching the load to the means for producing pulsed voltage, blocking the load voltage to inhibit discharge back through the circuit, and recovering and returning unused energy from the load back to the means for producing pulsed voltage. The method preferably further comprises the step of stepping up voltage from the means for producing pulsed voltage to the load with a transformer. The pulsed voltage is preferably produced from either a transformer/rectifier set or a power supply.

The step of producing pulsed voltage comprises the steps of charging at least one inversion circuit storage capacitor with charging means and closing a primary switch when the at least one inversion circuit storage capacitor becomes charged. Alternatively, the method of producing pulsed voltage comprises the steps of charging at lease one high voltage switching circuit storage capacitor located in series between a switching circuit inductor and at least one magnetic switch stage, and closing a primary switch when the at least one high voltage switching circuit storage capacitor becomes charged.

The method of recovering and returning unused energy from the load can be accomplished with at least one energy recovery diode and an energy recovery inductor in series with the at least one energy recovery diode. The step of recovering and returning unused energy from the load preferably further comprises the steps of recovering unused energy from the load with at least one energy recovery storage capacitor and at least one series charge element, both placed at the output of the means for charging the means for producing pulsed voltage, and recovering energy due to voltage reversals occurring in the load matching circuit with at least one energy recovery diode.

The step of matching the load to the means for producing pulsed voltage preferably comprises matching the load with at least one load matching blocking diode and at least one load matching capacitor that charges the load. The step of transferring energy from the means for producing pulsed voltage to the load preferably comprises the steps of saturating at least one magnetic switch stage with a charged capacitor and transferring energy from the means for producing pulsed voltage to the load with the at least one magnetic switch stage. Preferably, a fire-on voltage controller is used to control the trigger voltage for producing pulsed voltage.

The present invention is also a method of generating slow rise-time high voltage electrical pulses to a load comprising the steps of producing pulsed voltage, charging the means for producing pulsed voltage, blocking the load voltage to inhibit discharge back through the pulse generating circuit, and transferring energy from the means for producing pulsed voltage to the load with at least one magnetic switch stage. The step of producing pulsed voltage comprises the steps of charging at least one storage capacitor to a preset voltage and closing a primary switch when the at least one storage capacitor becomes charged to the preset voltage. The step of producing pulsed voltage also preferably comprises controlling the trigger voltage for closing the primary switch with a fire-on voltage controller.

A primary object of the present invention is to provide a slower rise-time for gradually getting energy to an electrostatic precipitator load without high current.

A primary advantage of the present invention is that a voltage pulse is produced on the electrostatic precipitator load, having a slower rise-time, and which aids in eliminating back-corona on the ESP plates.

Other objects, advantages and novel features, and further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated into and form a part of the specification, illustrate several embodiments of the present invention and, together with the description, serve to explain the principles of the invention. The drawings are only for the purpose of illustrating preferred embodiments of the invention and are not to be construed as limiting the invention. In the drawings.

DESCRIPTION OF THE PREFERRED EMBODIMENTS

(BEST MODES FOR CARRYING OUT THE INVENTION)

The present invention uses a high voltage pulse circuit to improve the collection efficiency of electrostatic precipitators (ESPs). The invention can be used along with an existing T/R set to generate the high voltage pulses on ESP load 24 (shown in each of FIGS. 1–10). Each embodiment of the present invention shown in the figures can also be used for the efficient generation of ozone and peroxide when load 24 is replaced with the respective load cell. The present invention can also be used for volatile organic compounds (VOC) destruction when load 24 is replaced with the respective load cell.

Figure 1:
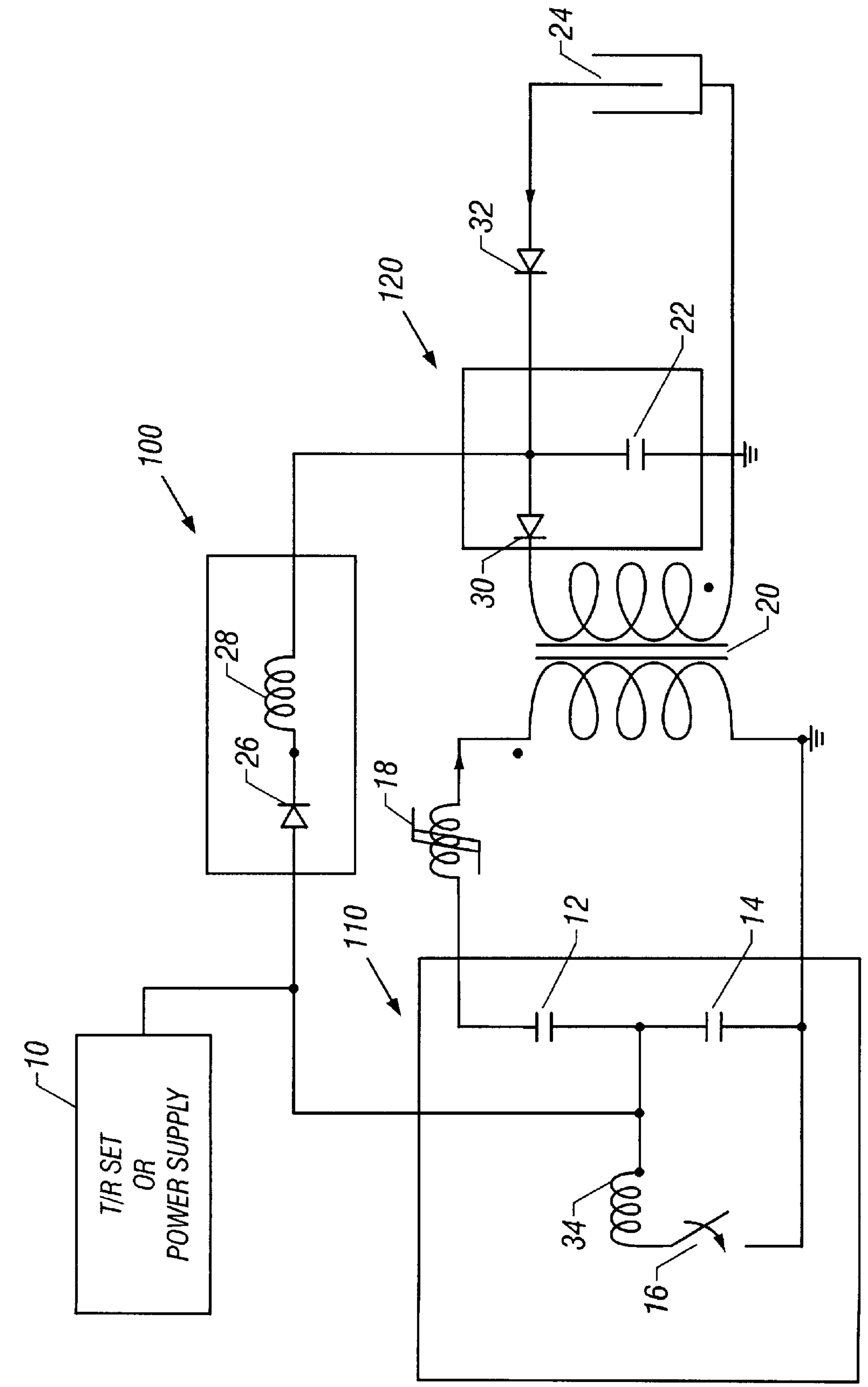
FIG. 1 is a schematic of a first embodiment of the electrostatic precipitator slow pulse generating circuit.

Attention is now turned to the figures. The first embodiment is shown in FIG. 1. This embodiment allows for the larger capacitance to be switched to load 24 where it can maintain an average electric field. The means for charging the means for producing pulsed voltage can be either existing T/R sets, or a power supply, 10 at a rate between 10 Hz and 10 kHz. Other charging means can also be used in each embodiment.

The means for producing pulsed voltage in this embodiment is an inversion circuit. Many types of inversion circuits could be used in this and other embodiments, and would be apparent to those skilled in the art. In this embodiment, circuit operation is as follows. First, inversion circuit first primary storage capacitor 12 and inversion circuit second primary storage capacitor 14 are charged to a preset voltage. Once storage capacitors 12 and 14 have been charged, primary switch 16 is triggered and closes. When switch 16 closes, the voltage on second storage capacitor 14 reverses adding to the voltage on first storage capacitor 12. The voltage on first magnetic switch 18, which is the total voltage across storage capacitors 12 and 14, is doubled and first magnetic switch 18 saturates. When magnetic switch 18 saturates, the energy from storage capacitors 12 and 14 is transferred across transformer 20 where it is stepped up and charges load matching capacitor 22, thereby transferring energy from inversion circuit 110 to load matching circuit 120. Capacitor 22 is charged along with load 24. The voltage at this point is between 20 kV and 100 kV because of step-up transformer 20. Any unused energy that does not get utilized by load 24 is transferred back to inversion circuit primary storage capacitors 12 and 14 through energy recovery circuitry 100 made up of energy recovery diode 26 and energy recovery inductor 28. Load matching blocking diode 30 and load blocking diode 32 are added between capacitor 22 and load 24 to maintain an average voltage on load 24 during the complete cycle. At this point the process is repeated. Load blocking diode 32 inhibits voltage from the ESP from discharging back through the slow pulse generating circuit. In this manner, the voltage on the ESP decays at a rate that is set by the discharge time due to the ESP capacitance and resistance.

In this embodiment, inversion circuit 110 is made up of inversion circuit primary storage capacitors 12 and 14, primary switch 16, and inversion circuit inductor 34. Primary switch 16 may be a thyratron, SCR or SCR stack, ignitron, spark gap, IGBT, pseudospark, radial pseudospark, any solid state device, or vacuum switch. Load matching circuit 120 is made up of diode 30 and capacitor 22. Load matching circuit 120 works with energy recovery circuit 100.

All diodes shown in every embodiment of the present invention are preferably each a high voltage diode stack. In this first embodiment, inductor 28 preferably has a range of values, for example, between 100 μH and 1000 mH. Inductor 34 preferably can range, for example, between 1 μH and 100 mH. Transformer 20 has a turn ratio of 1:N. Capacitor 12 and capacitor 14 are the same value and are preferably in the range of $N^2$ times 1 to 20 times the ESP capacitance. The ESP capacitance can be, for example, 150 nF. Capacitor 22 can be one-half to ten times the ESP capacitance; for example, for an ESP of 150 nF, capacitor 22 would be in the range of 75 nF to 1500 nF. Magnetic switch 18 is preferably designed to hold off twice the charge voltage of capacitor 12 and capacitor 14 long enough for the voltage on capacitor 14 to reverse, for example, 2 microseconds to 500 microseconds.

Figure 2:
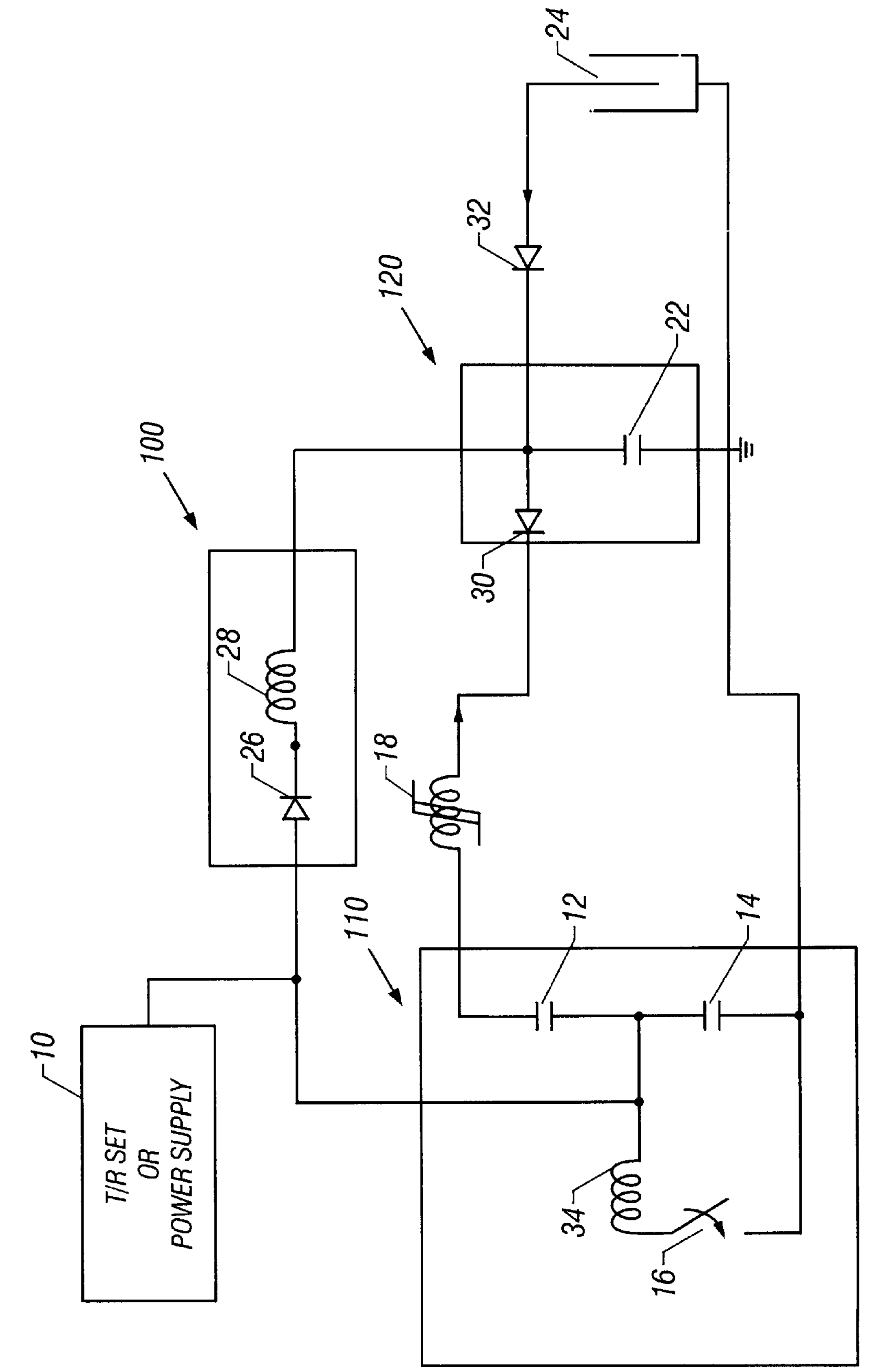
FIG. 2 is a schematic of a second embodiment of the electrostatic precipitator slow pulse generating circuit.

In a second embodiment, the present invention is used without transformer 20 (shown in FIG. 1) as shown in FIG. 2. In this embodiment, the circuit operates as follows. First, inversion circuit first primary storage capacitor 12 and inversion circuit second primary storage capacitor 14 are charged to one-half the desired load voltage. Once capacitors 12 and 14 have been charged, primary switch 16 is triggered and closes. When switch 16 closes, the voltage on second primary storage capacitor 14 reverses and the voltage on first magnetic switch 18 is doubled and first magnetic switch 18 saturates. When magnetic switch 18 saturates, the energy from capacitors 12 and 14 is transferred to load matching capacitor 22. Capacitor 22 is charged along with load 24. The voltage at this point is between 20 kV and 100 kV. Any unused energy that does not get utilized by load 24 is transferred back to inversion circuit primary storage capacitors 12 and 14 through energy recovery circuitry 100 made up of energy recovery diode 26 and energy recovery inductor 28. Load matching blocking diode 30 and load blocking diode 32 are added between capacitor 22 and load 24 to maintain an average voltage on load 24 during the complete cycle. At this point the process is repeated.

Inversion circuit 110 is made up of inversion circuit primary storage capacitors 12 and 14, primary switch 16, and inversion circuit inductor 34. Primary switch 16 may be a thyratron, SCR or SCR stack, ignitron, spark gap, IGBT, pseudospark, radial pseudospark, any solid state device, or vacuum switch. Load matching circuit 120 is made up of diode 30 and capacitor 22. Load matching circuit 120 works with energy recovery circuit 100.

The circuit element values for the second embodiment are preferably in the same range as those for the first embodiment discussed above. However, there is no transformer. Furthermore, capacitor 12 and capacitor 14 are equal to one another and are preferably equal to 1 to 20 times the ESP capacitance.

Figure 3:
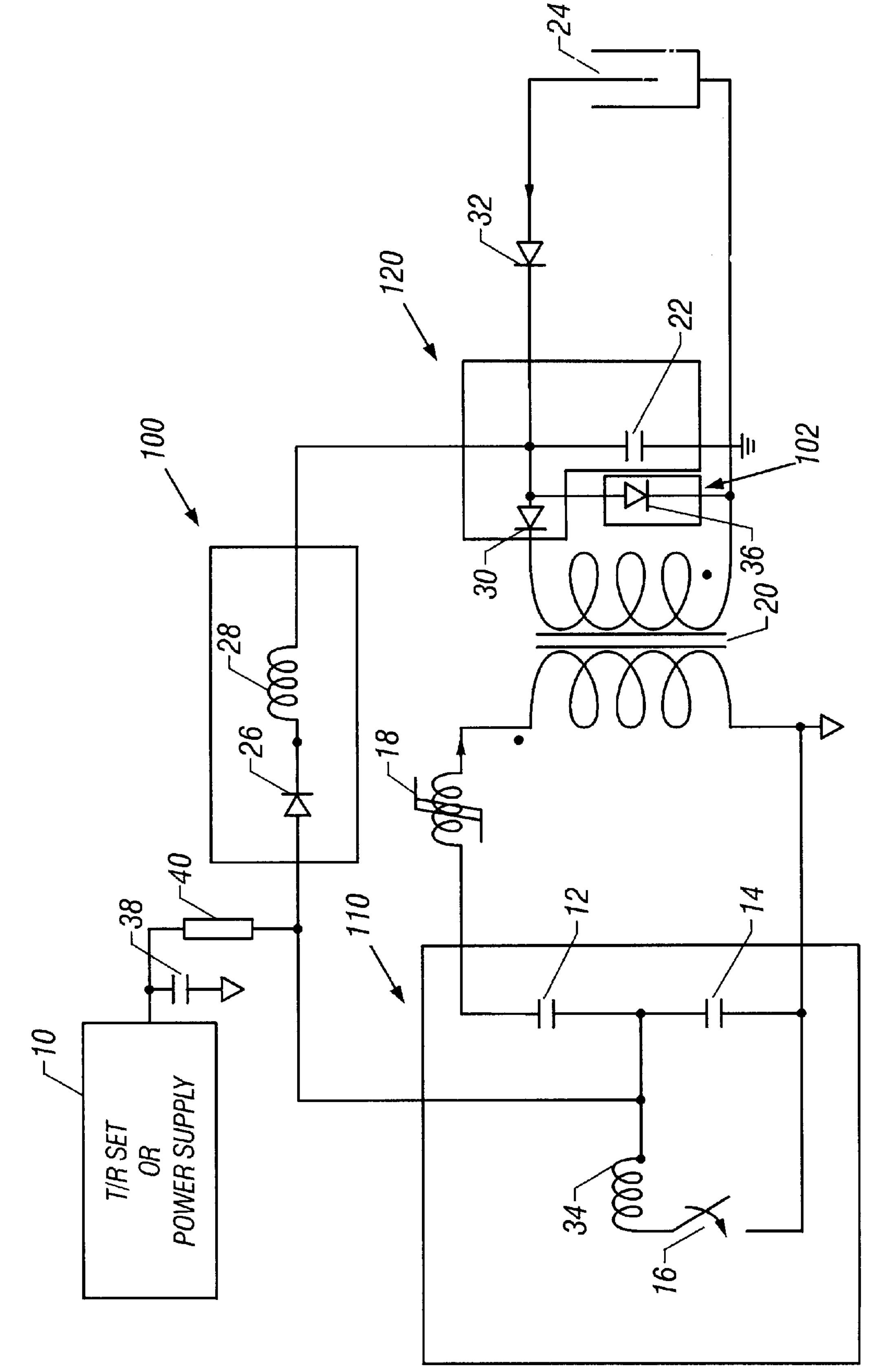
FIG. 3 is a schematic of a third embodiment of the electrostatic precipitator slow pulse generating circuit.

In a third embodiment of the present invention, an alternative energy recovery circuit is used as shown in FIG. 3 at 100 and 102. This energy recovery circuit allows for larger capacitance to be switched to load 24 where it can maintain an average electric field. As in previous embodiments, the system can be charged with existing T/R sets, or a power supply, 10 at a rate between 10 Hz and 10 kHz. Energy recovery storage capacitor 38 is used on the output of T/R set (or power supply) 10 with a series charge element 40 which can be either a series charge resistor or an inductor.

Circuit operation is as follows. First, inversion circuit first primary storage capacitor 12 and inversion circuit second primary storage capacitor 14 are charged to a preset voltage. Once primary storage capacitors 12 and 14 have been charged, primary switch 16 is triggered and closes. When primary switch 16 closes, the voltage on second primary storage capacitor 14 reverses and the voltage on first magnetic switch 18 is doubled, and first magnetic switch 18 saturates. When magnetic switch 18 saturates, the energy from primary storage capacitors 12 and 14 is transferred across transformer 20 where it is stepped up thereby charging load matching capacitor 22. Capacitor 22 is charged along with load 24. The voltage at this point is between 20 kV and 100 kV because of the step-up transformer 20. Any unused energy that does not get utilized by load 24 is transferred back to primary storage capacitors 12 and 14 through that part of the energy recovery circuitry made up of energy recovery diode 26 and energy recovery inductor 28. Energy recovery diode 36 is used to recover any energy due to voltage reversals on capacitor 22. Load matching blocking diode 30 and load blocking diode 32 are added between capacitor 22 and load 24 to maintain an average voltage on load 24 during the complete cycle. At this point the process is repeated.

Inversion circuit 110 is made up of inversion circuit primary storage capacitors 12 and 14, primary switch 16, and inversion circuit inductor 13. Again, primary switch 16 may be a thyratron, SCR or SCR stack, ignitron, spark gap, IGBT, pseudospark, radial pseudospark, any solid state device, or vacuum switch. Load matching circuit 120 is made up of diode 30 and capacitor 22. Load matching circuit 120 works with energy recovery circuit shown at 100 and 102. The energy recovery circuit shown at 100 and 102 is made up of diode 26 and diode 36, and inductor 28, along with energy storage capacitor 38 and series charge resistor (or inductor) 40.

Many of the circuit element values of the third embodiment are preferably in the same range as those described in the previous embodiments. In this third embodiment, however, capacitor 38 is preferably greater than or equal to capacitor 14. Series charge element 40, which is either a charging resistor or inductor, can preferably be for example a 5 kiloohm resistor or a 100 $\mu$H inductor.

Figure 4:
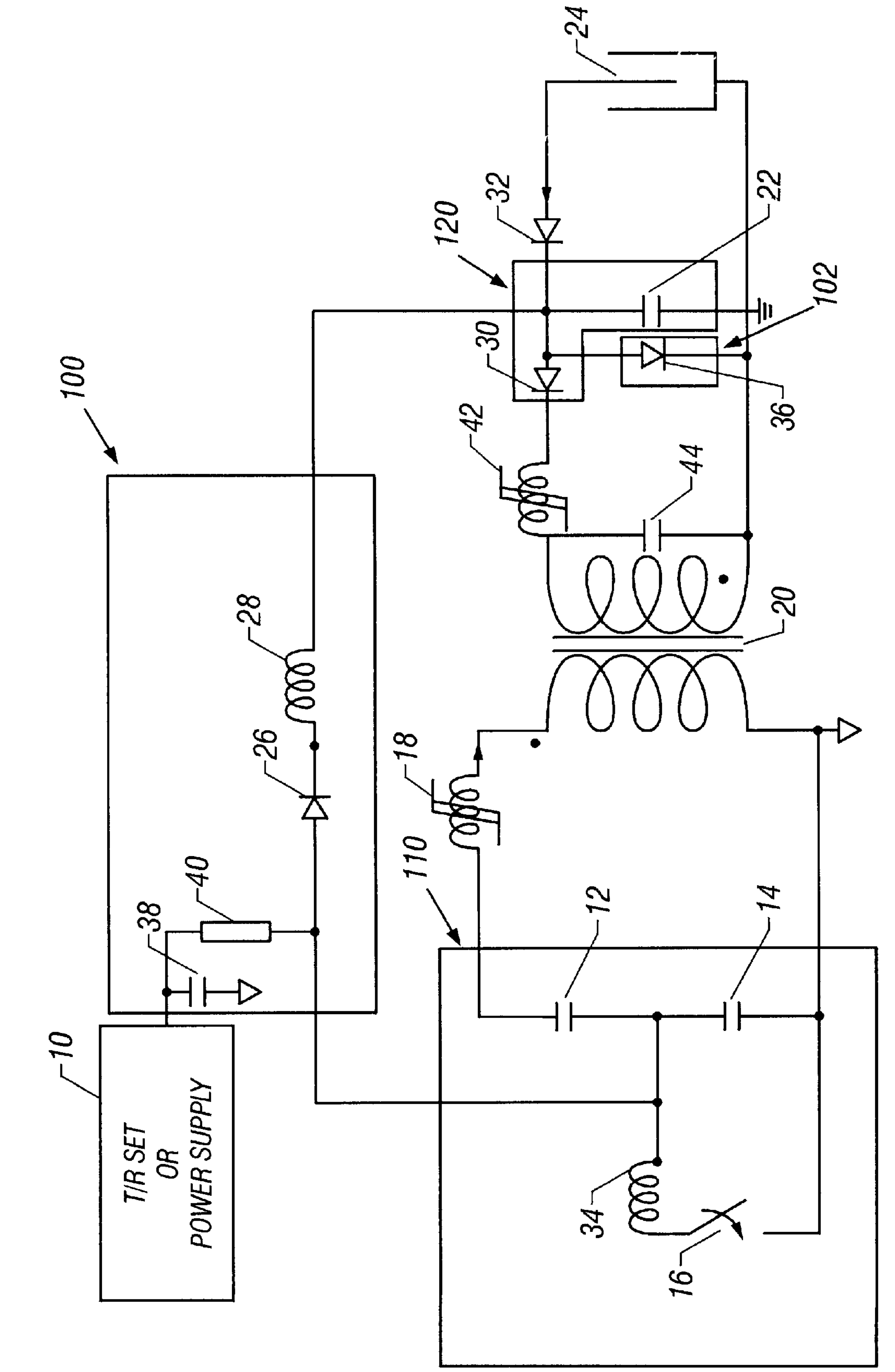
FIG. 4 is a schematic of a fourth embodiment of the electrostatic precipitator slow pulse generating circuit.

In a fourth embodiment of the present invention, another magnetic switch stage is added as shown in FIG. 4. This allows for larger capacitance to be switched to load 24 where it can maintain an average electric field. The system is again shown being charged with either existing T/R sets, or a power supply, 10 at a rate between 10 Hz and 10 kHz. Energy storage capacitor 38 is again used on the output of T/R sets (or power supply) 10 with a series charge resistor (or inductor) 40.

First, inversion circuit first primary storage capacitor 12 and inversion circuit second primary storage capacitor 14 are charged to a preset voltage. Once primary storage capacitors 12 and 14 have been charged, primary switch 16 is triggered and closes. When primary switch 16 closes, the voltage on second primary storage capacitor 14 reverses and the voltage on first magnetic switch 18 is doubled, and first magnetic switch 18 saturates. When magnetic switch 18 saturates, the energy from primary storage capacitors 12 and 14 is transferred across transformer 20 where it is stepped up thereby charging capacitor 44. This configuration can be utilized with or without transformer 20. Once capacitor 44 is charged and second magnetic switch 42 saturates, the energy in capacitor 44 is transferred to capacitor 22 along with load 24. The voltage at this point is between 20 kV and 100 kV because of step-up transformer 20. Any unused energy that does not get utilized by load 24 is transferred back to primary storage capacitors 12 and 14 through that part of the energy recovery circuitry made up of diode 26 and inductor 28. Diode 36 is used to recover any energy due to voltage reversals on capacitor 22. Load matching blocking diode 30 and load blocking diode 32 maintain an average voltage on load 24 during the complete cycle. At this point the process is repeated.

Inversion circuit 110 is made up of inversion circuit primary storage capacitors 12 and 14, primary switch 16, and inductor 34. Primary switch 16 may be a thyratron, SCR or SCR stack, ignitron, spark gap, IGBT, pseudospark, radial pseudospark, any solid state device, or vacuum switch. Load matching circuit 120 is made up of diode 30 and capacitor 22 and works with the energy recovery circuit shown at 100 and 102. The energy recovery circuit as shown at 100 and 102 is made up of diode 26 and diode 36, and inductor 28, along with energy storage capacitor 38 and series charge resistor (or inductor) 40.

Many of the circuit elements of the fourth embodiment preferably have a range of values as presented in previous embodiments. However, magnetic switch 42 is preferably designed to hold the high voltage charge on capacitor 44 until 80–100% of the maximum charge is reached. Capacitor 44 is preferably anywhere from one-half to ten times the ESP capacitance. Capacitor 22 is also preferably anywhere from one-half to ten times the ESP capacitance.

Figure 5:
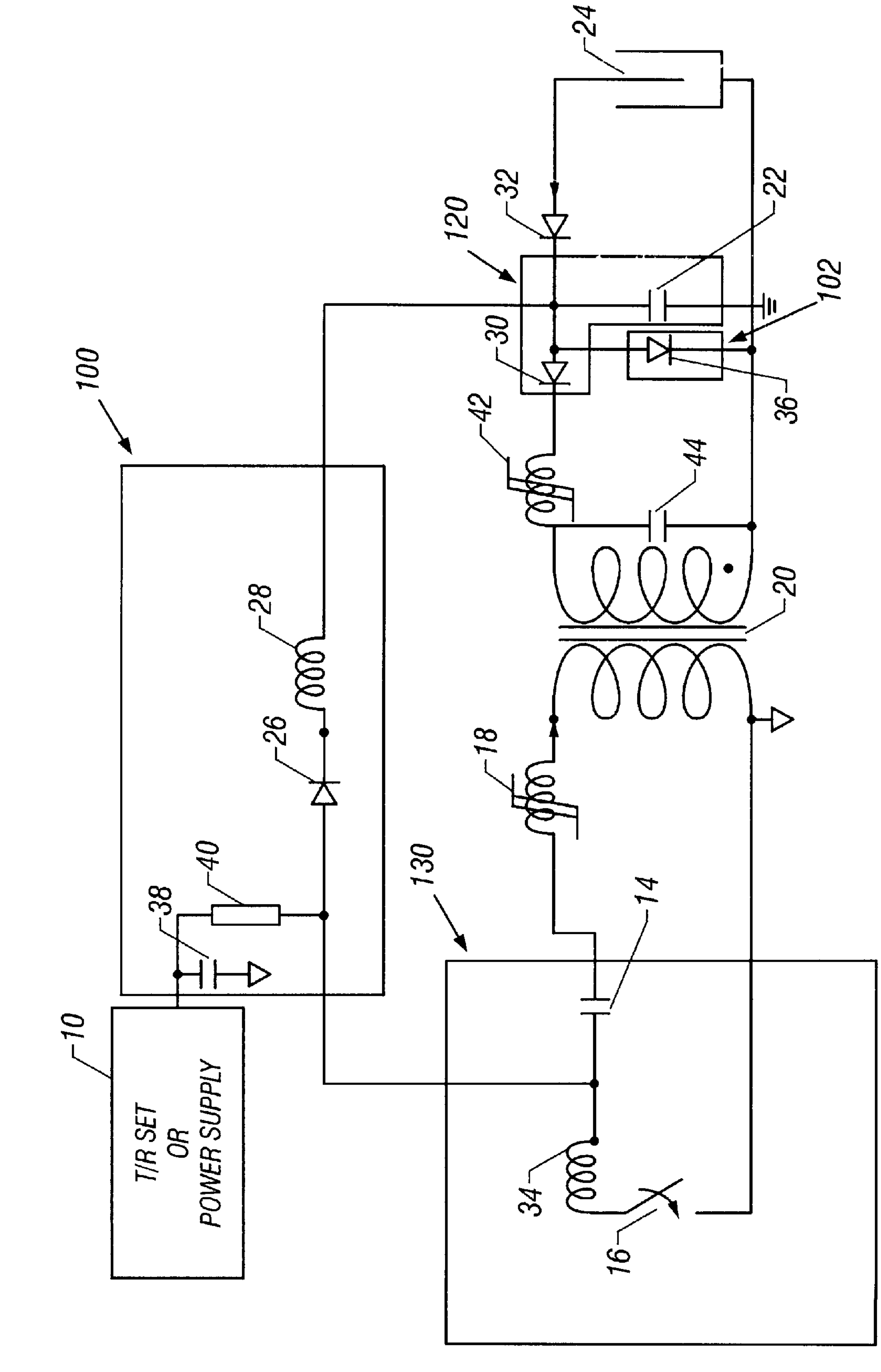
FIG. 5 is a schematic of a fifth embodiment of the electrostatic precipitator slow pulse generating circuit.

A fifth embodiment of the present invention is shown in FIG. 5. As before, this embodiment also allows for larger capacitance to be switched to the load where it can maintain an average electric field. The system is shown charged with either existing T/R sets (or a power supply) 10 at a rate between 10 Hz and 10 kHz. Energy storage capacitor 38 is used on the output of T/R sets (or power supply) 10 along with a series charge resistor (or inductor) 40.

In this embodiment the means for producing the pulsed voltage is a high voltage switching circuit 130. First, switching circuit primary storage capacitor 14 is charged to a preset voltage. Once capacitor 14 has been charged, primary switch 16 is triggered and closes. When primary switch 16 closes, the voltage on capacitor 14 is seen across first magnetic switch 18 and first magnetic switch 18 saturates. When magnetic switch 18 saturates, the energy from capacitor 14 is transferred across transformer 20 where it is stepped up and charges capacitor 44. This embodiment can be utilized with or without transformer 20. Capacitor 44 is charged and second magnetic switch 42 saturates and energy in capacitor 44 is transferred to capacitor 22 along with load 24. This embodiment can be utilized with or without capacitor 44 and second magnetic switch 42. The voltage at this point is between 20 kV and 100 kV because of step-up transformer 20. Any unused energy that does not get utilized by load 24 is transferred back to storage capacitor 14 through that part of the energy recovery circuitry made up of diode 26 and inductor 28. Energy recovery diode 36 is used to recover any energy due to voltage reversals on capacitor 22. Blocking diodes 30 and 32 maintain an average voltage on load 24 during the complete cycle. At this point the process is repeated.

High voltage switching circuit 130 is made up of capacitor 14, primary switch 16, and switching circuit inductor 34. Primary switch 16 may be a thyratron, SCR or SCR stack, ignitron, spark gap, IGBT, pseudospark, radial pseudospark, any solid state device, or vacuum switch. Load matching circuit 120 is made up of diode 30 and capacitor 22 and works with the energy recovery circuit that is shown at 100 and 102. The energy recovery circuitry that is shown at 100 and 102 is made up of diodes 26 and 36, inductor 28, along with energy storage capacitor 38 and series charge resistor (or inductor) 40.

Many of the circuit element values of the fifth embodiment are preferably in the same range as those presented in previous embodiments. However, capacitor 14 as shown in FIG. 5 is preferably equal to $N^2$ times 1 to 20 times the ESP capacitance. Transformer 20 has a turns ratio of 1:N.

Figure 6:
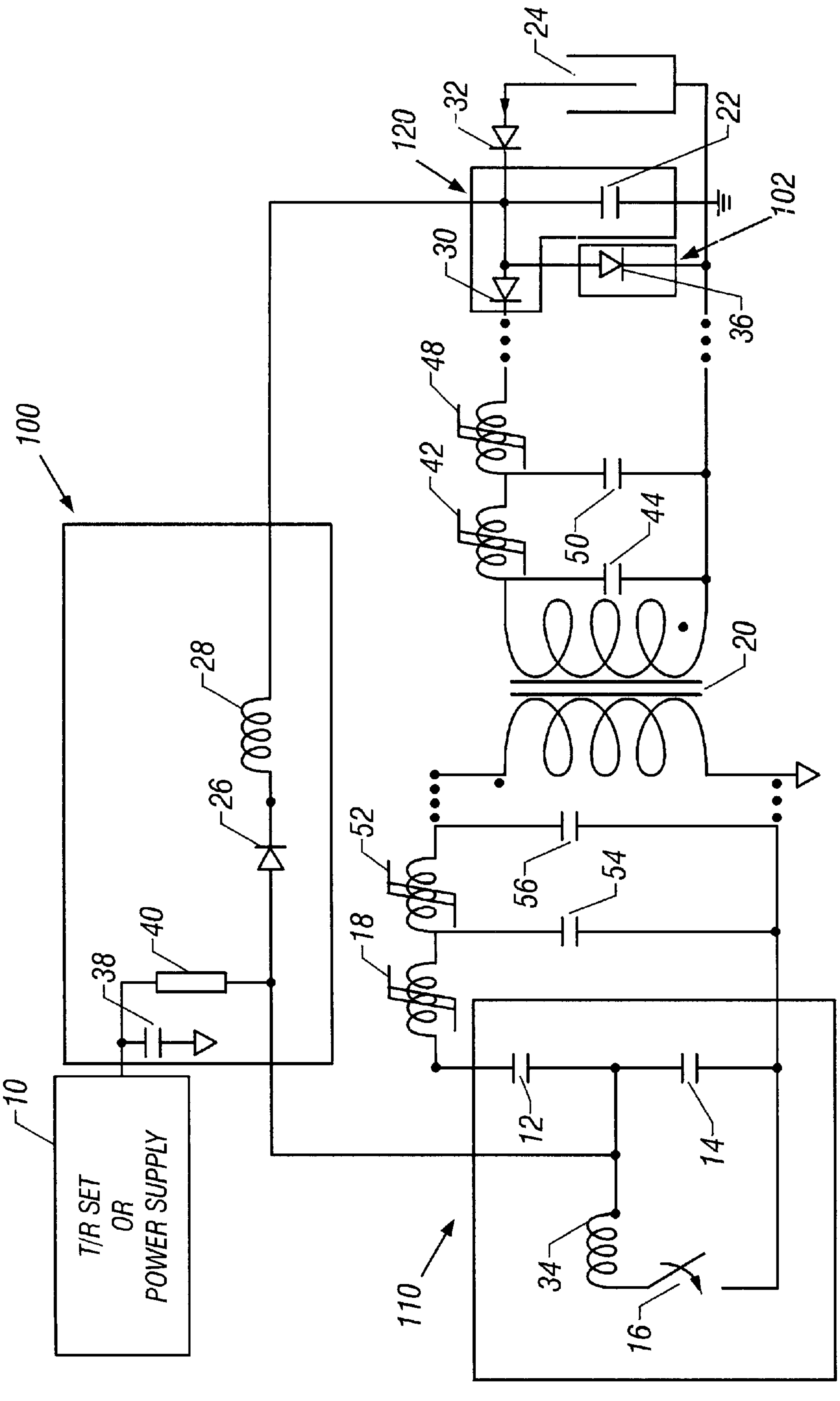
FIG. 6 is a schematic of a sixth embodiment of the electrostatic precipitator slow pulse generating circuit.

In a sixth embodiment of the present invention, multiple magnetic switches, or compression stages, are shown along with the use of a transformer in FIG. 6. All embodiments discussed for the present invention can utilize multiple magnetic switches or compression stages with and without the use of a transformer. This allows for the larger capacitance to be switched to load 24 where it can maintain an average electric field. Again, the system is charged with either existing T/R sets (or a power supply) 10 at a rate between 10 Hz and 10 kHz. Energy storage capacitor 38 is used on the output of T/R sets (or power supply) 10 along with series charge resistor (or inductor) 40.

First, first inversion circuit primary storage capacitor 12 and inversion circuit second primary storage capacitor 14 are charged to a preset voltage. Once these capacitors have been charged, primary switch 16 is triggered and closes. When primary switch 16 closes, the voltage on capacitor 14 reverses and the voltage on first magnetic switch 18 is doubled and first magnetic switch 18 saturates. When magnetic switch 18 saturates, the energy from capacitors 12 and 14 is transferred to capacitor 54. Once charged, the energy from capacitor 54 is transferred to capacitor 56 through magnetic switch 52, and so on, for any possible number of stages. At the final stage, the energy is transferred across transformer 20 where it is stepped up and then charges capacitor 44. This embodiment can be utilized with or without transformer 20. Capacitor 44 is charged and second magnetic switch 42 saturates and the energy in capacitor 44 is then transferred to capacitor 50. Once charged, magnetic switch 48 saturates and the energy is transferred to the next capacitor in the switch stage, and there can be any number of stages. Once the energy is transferred to the last stage, it will charge up load matching capacitor 22 along with load 24. The voltage at this point is between 20 kV and 100 kV because of step-up transformer 20. Any unused energy that does not get utilized by load 24 is transferred back to primary storage capacitors 12 and 14 through that part of the energy recovery circuitry made up of diode 26 and inductor 28. Energy recovery diode 36 is used to recover any energy due to voltage reversals on capacitor 22. Blocking diodes 30 and 32 maintain an average voltage on load 24 during the complete cycle. At this point the process is repeated.

Inversion circuit 110 is made up of primary storage capacitors 12 and 14, primary switch 16, and inversion circuit inductor 34. Primary switch 16 may be a thyratron, SCR or SCR stack, ignitron, spark gap, IGBT, pseudospark, radial pseudospark, any solid state device, or vacuum switch. Load matching circuit 120 is made up of diode 30 and capacitor 22 and works with the energy recovery circuitry that is shown at 100 and 102. The energy recovery circuitry that is shown at 100 and 102 is made up of diodes 26 and 36, inductor 28, along with energy storage capacitor 38 and series charge resistor (or inductor) 40.

Many of the circuit elements of the sixth embodiment preferably have a range of values the same as those presented above. Magnetic switch 42 is preferably designed to hold the high voltage charge on capacitor 44 until 80–100% of the maximum charge is reached. Magnetic switch 48 is preferably designed to hold the high voltage charge on capacitor 50 until 80–100% of the maximum charge is reached. Capacitor 54 is preferably equal to $N^2$ times 1 to 20 times the ESP capacitance. Capacitor 56 is also preferably equal to $N^2$ times 1 to 20 times the ESP capacitance. Magnetic switch 52 is preferably designed to hold the high voltage charge on capacitor 54 until 80–100% of the maximum charge is reached. Again, capacitor 12 is equal to capacitor 14 and is preferably equal to $N^2$ times 1 to 20 times the ESP capacitance. Magnetic switch 18 is preferably designed to hold off twice the charge voltage of capacitor 12 and capacitor 14 long enough for the voltage on capacitor 14 to reverse. Magnetic switch stages having capacitor 44, capacitor 50, etc., are anywhere from one-half to ten times the value of the ESP capacitance.

Figure 7:
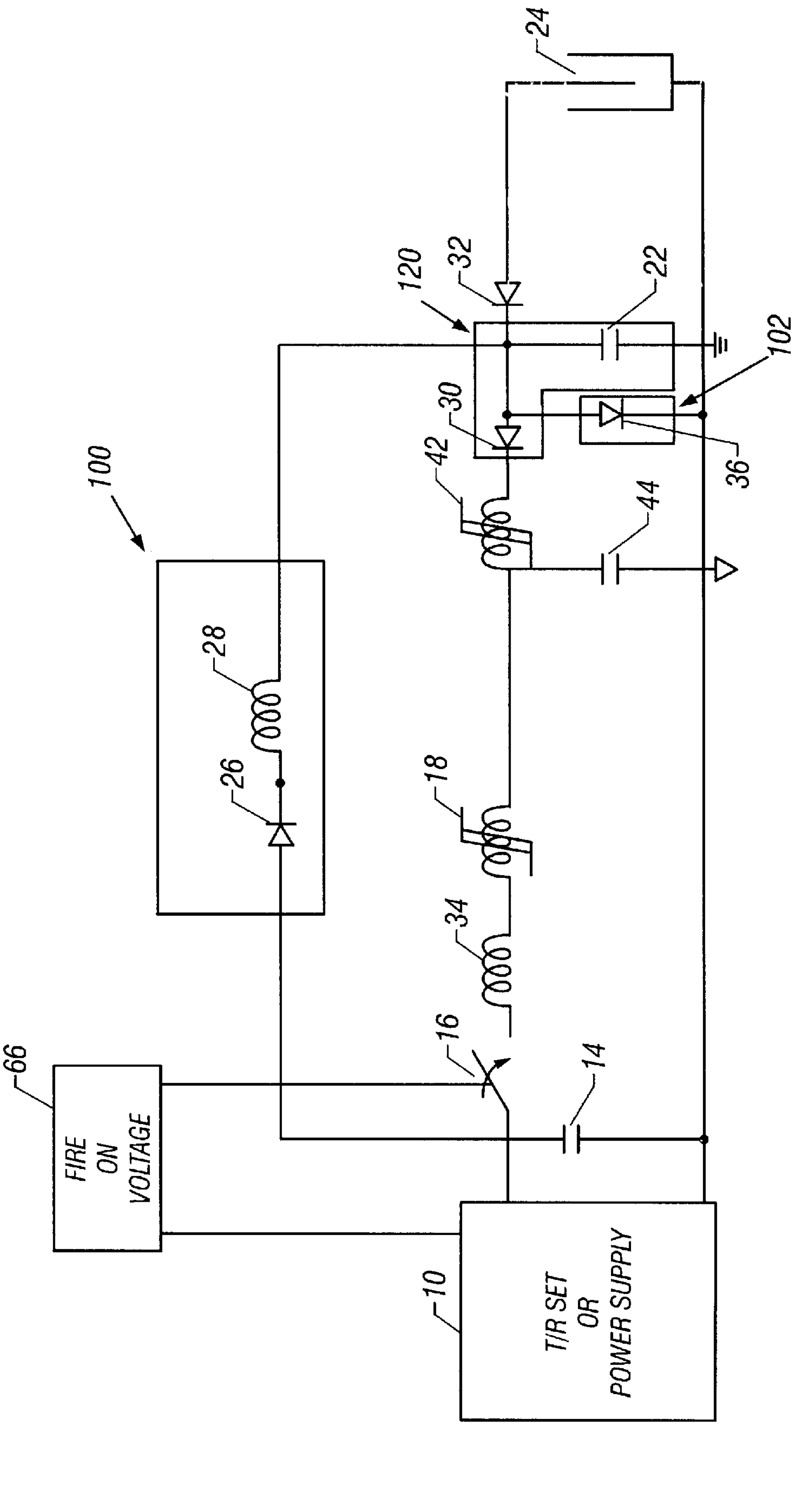
FIG. 7 is a schematic of a seventh embodiment of the electrostatic precipitator slow pulse generating circuit.

A seventh embodiment for the present invention is shown in FIG. 7. As the previous embodiments, this allows for the larger capacitance to be switched to load 24 where it can maintain an average electric field. The system is shown charged with either existing T/R sets (or a power supply) 10 at a rate between 10 Hz and 10 kHz.

First, primary storage capacitor 14 is charged to a preset voltage. Once capacitor 14 has been charged, primary switch 16 is triggered and closes. In this embodiment, the voltage which causes primary switch 16 to trigger is determined by fire-on-voltage controller 66 (as discussed below with respect to FIG. 8). When primary switch 16 closes, the voltage on capacitor 14 is held off for a short time by first magnetic switch 18. Magnetic switch 18 is operating as an assist. Inductor 34 sets up the ringing frequency, thereby determining the discharge time, from capacitor 14 to capacitor 44. Once magnetic switch 18 saturates, the energy from primary storage capacitor 14 is transferred to capacitor 44. The voltage on capacitor 44 is also across second magnetic switch 42 which causes it to saturate. When magnetic switch 42 saturates, the energy from capacitor 44 is transferred to capacitor 22. Capacitor 22 is charged along with load 24. Any unused energy that does not get utilized by load 24 is transferred back to storage capacitor 14 through that part of the energy recovery circuitry made up of diode 26 and inductor 28. Blocking diodes 30 and 32 maintain an average voltage on load 24 during the complete cycle. At this point the process is repeated. As discussed previously, load blocking diode 32 acts to keep the voltage from the ESP from discharging back through the circuit. In this manner, the voltage on the ESP decays at a rate that is set by the discharge time due to the ESP capacitance and resistance. Switch 16 may be a thyratron, SCR or SCR stack, ignitron, spark gap, IGBT, pseudospark, radial pseudospark, any solid state device, or vacuum switch. Load matching circuit 120 is made up of diode 30 and capacitor 22 and works with the energy recovery circuitry that is shown at 100 and 102.

The circuit element values in the seventh embodiment are preferably again as presented in previous embodiments. However, magnetic switch 18 is preferably designed to hold off the charge voltage on capacitor 14, for example for 2 to 500 microseconds, or 80–90% of the charge. Capacitors 14, 44, and 22 are all preferably one-half to ten times the value of the ESP capacitance.

Figure 8:
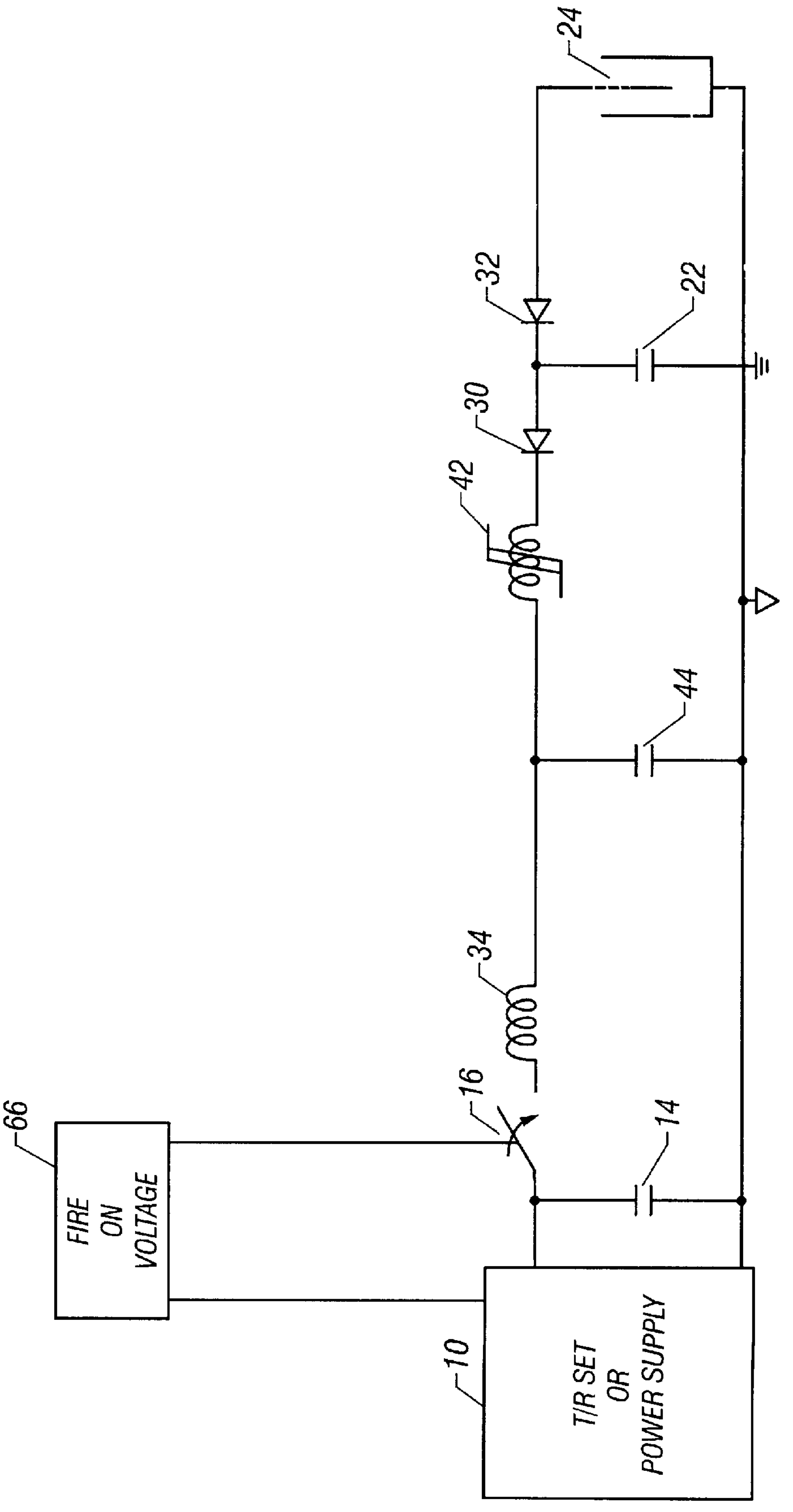
FIG. 8 is a schematic of an eighth embodiment of the electrostatic precipitator slow pulse generating circuit.

An eighth embodiment of the present invention is shown in FIG. 8. Like the previous embodiments, this embodiment allows for the larger capacitance to be switched to load 24 where it can maintain an average electric field. The system is shown being charged with either existing T/R sets (or a power supply) 10 at a rate between 10 Hz and 10 kHz.

First, primary storage capacitor 14 is charged to a preset voltage. Once capacitor 14 has been charged, primary switch 16 is triggered and closes. The voltage that triggers switch 16 is determined by fire-on-voltage controller 66, which compares the charge voltage to a preset level. Once the charge voltage matches the preset level, the circuit generates a trigger pulse for switch 16. When switch 16 closes, the voltage on capacitor 14 is transferred to capacitor 44. Inductor 34 sets up the ringing frequency, thereby determining the discharge time, from capacitor 14 to capacitor 44. The voltage on capacitor 44 has been placed across magnetic switch 42 which causes it to saturate. When magnetic switch 42 saturates, the energy from capacitor 44 is transferred to capacitor 22. Capacitor 22 is charged along with load 24. No energy recovery circuit is used in this embodiment. Blocking diodes 30 and 32 are on both sides of capacitor 22 to maintain an average voltage on load 24 during the complete cycle. At this point the process is repeated. Load blocking diode 32 acts to keep the voltage form the ESP from discharging back through the circuit. In this manner, the voltage on the ESP decays at a rate that is set by the discharge time due to the ESP capacitance and resistance. Switch 16 may be a thyratron, SCR or SCR stack, ignitron, spark gap, IGBT, pseudospark, radial pseudospark, any solid state device, or vacuum switch.

The circuit element values for the eighth embodiment are preferably as discussed in previous embodiments. However, capacitors 14, 44, and 22 are preferably from one-half to ten times the value of the ESP capacitance.

Figure 9:
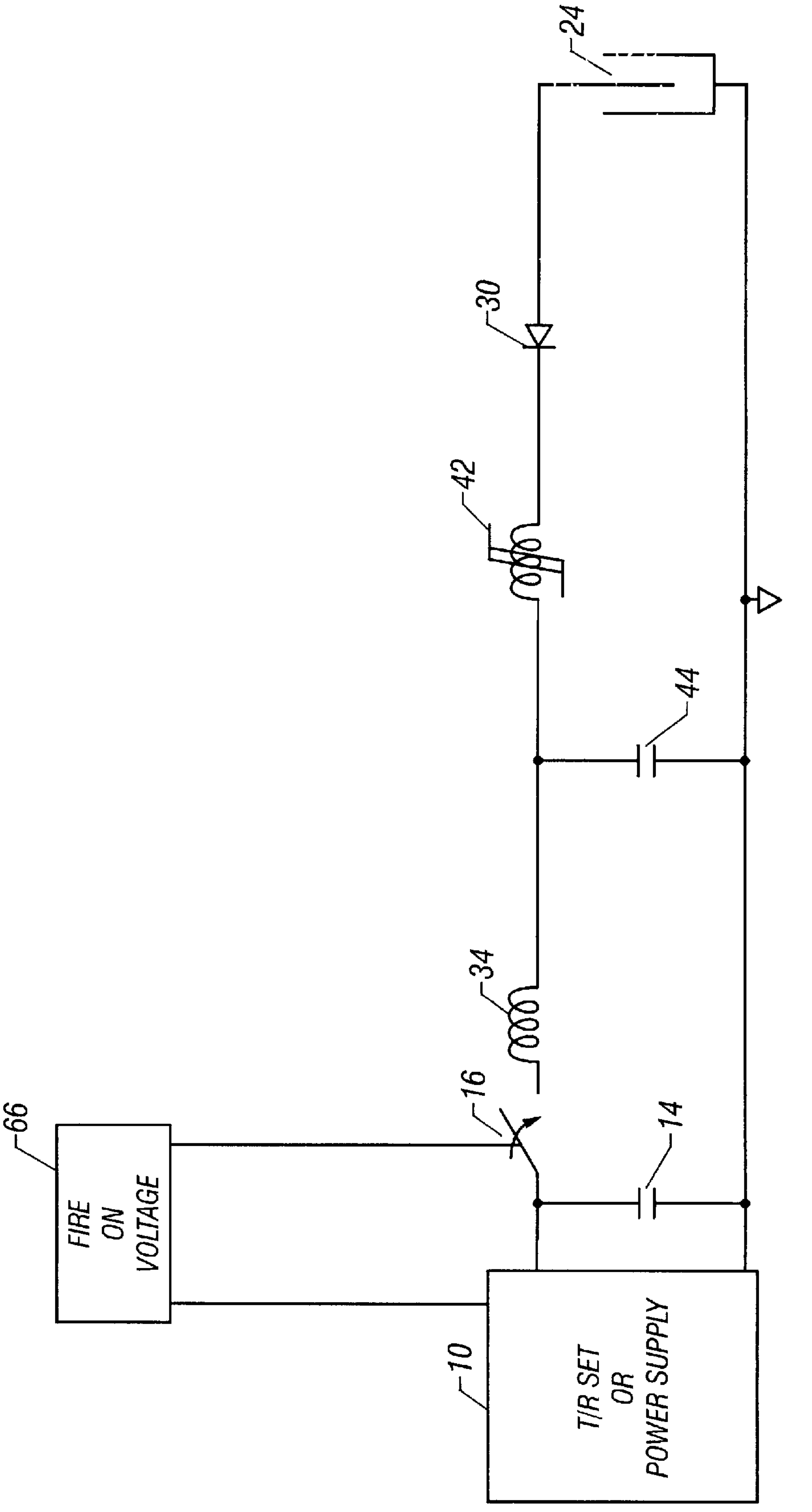
FIG. 9 is a schematic of a ninth embodiment of the electrostatic precipitator slow pulse generating circuit.

A ninth embodiment for the present invention is shown in FIG. 9. This embodiment also allows for the larger capacitance to be switched to load 24 where it can maintain an average electric field. The system is charged with either existing T/R sets (or a power supply) 10 at a rate between 10 Hz and 10 kHz.

First, primary storage capacitor 14 is charged to a preset voltage. Once capacitor 14 has been charged, primary switch 16 is triggered and closes. The voltage that triggers switch 16 is determined by fire-on-voltage controller 66, which compares the charge voltage to a preset level. Once the charge voltage matches the preset level, the circuit generates a trigger pulse for switch 16. When switch 16 closes, the voltage on capacitor 14 is transferred to capacitor 44. Inductor 34 sets up the ringing frequency, thereby determining the discharge time, from capacitor 14 to capacitor 44. The voltage on capacitor 44 has been placed across magnetic switch 42 which causes it to saturate. When magnetic switch 42 saturates, the energy from capacitor 44 is transferred to load 24. No energy recovery circuit is used in this embodiment. Blocking diode 30 is between capacitor 44 and load 24 to maintain an average voltage on load 24 during the complete cycle. At this point the process is repeated. Load blocking diode 30 acts to keep the voltage form the ESP from discharging back through the circuit. In this manner, the voltage on the ESP decays at a rate that is set by the discharge time due to the ESP capacitance and resistance. Switch 16 may be a thyratron, SCR or SCR stack, ignitron, spark gap, IGBT, pseudospark, radial pseudospark, any solid state device, or vacuum switch.

The circuit element values for the ninth embodiment are preferably as presented above, however, capacitors 14, and 44 are preferably from one-half to ten times the value of the ESP capacitance.

Figure 10:
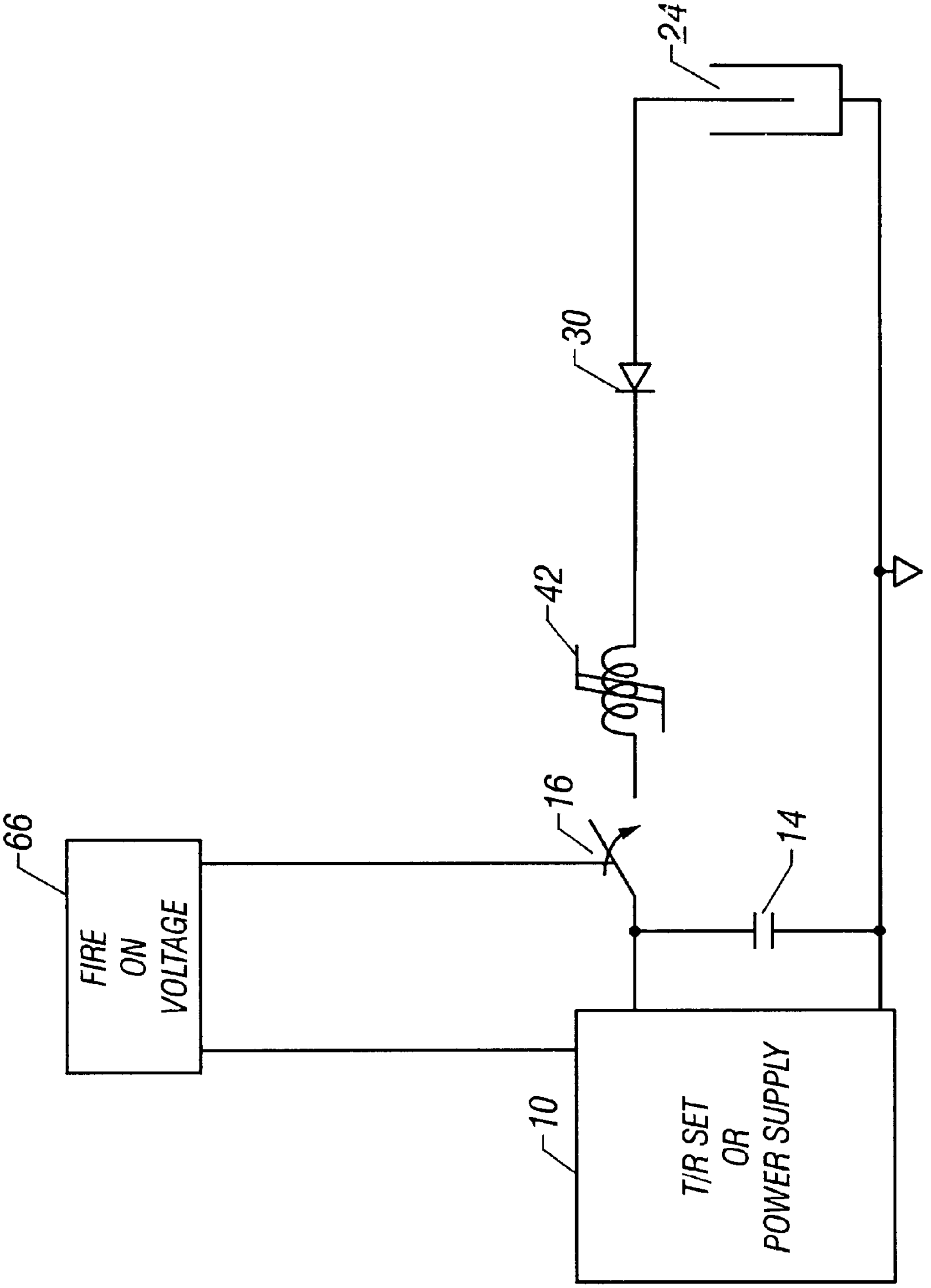
FIG. 10 is a schematic of a tenth embodiment of the electrostatic precipitator slow pulse generating circuit.

A tenth embodiment for the present invention is shown in FIG. 10. This embodiment also allows for the larger capacitance to be switched to load 24 where it can maintain an average electric field. The system is charged with either existing T/R sets (or a power supply) 10 at a rate between 10 Hz and 10 kHz.

First, primary storage capacitor 14 is charged to a preset voltage. Once capacitor 14 has been charged, primary switch 16 is triggered and closes. The voltage that triggers switch 16 is determined by fire-on-voltage controller 66, which compares the charge voltage to a preset level. Once the charge voltage matches the preset level, the circuit generates a trigger pulse for switch 16. When switch 16 closes, the voltage on capacitor 14 is held off for a short time by magnetic switch 42, which operates as an assist. Once magnetic switch 42 saturates, the energy from capacitor 14 is transferred to load 24. No energy recovery circuit is used in this embodiment. Blocking diode 30 is added between capacitor 14 and load 24 to maintain an average voltage on load 24 during the complete cycle. At this point the process is repeated. Diode 30 acts to keep the voltage form the ESP from discharging back through the circuit. In this manner, the voltage on the ESP decays at a rate that is set by the discharge time due to the ESP capacitance and resistance. Switch 16 may be a thyratron, SCR or SCR stack, ignitron, spark gap, IGBT, pseudospark, radial pseudospark, any solid state device, or vacuum switch.

Circuit element values for the tenth embodiment are preferably as presented above, however, capacitor 14 is preferably from one-half to ten times the value of the ESP capacitance.

The advantages to the present invention are that a slower rise-time is achieved which creates a gradual means for quickly getting energy to the load without the high current that is typical in the prior art.

Although the invention has been described in detail with particular reference to these preferred embodiments, other embodiments can achieve the same results. Variations and modifications of the present invention will be obvious to those skilled in the art and it is intended to cover in the appended claims all such modifications and equivalents. The embodiments presented are not the only means for accomplishing the invention. For example, the invention is not limited by the number of capacitors used in the various sub-circuits or the number of magnetic switch stages shown in the figures. Variations in the circuit elements will be apparent to those skilled in the art. The entire disclosures of all references, applications, patents, and publications cited above are hereby incorporated by reference.

What is claimed is:

1. A circuit for generating slow rise-time, high voltage electrical pulses to a load, said circuit comprising:

means for producing pulsed voltage;

means for charging said means for producing pulsed voltage;

an energy recovery circuit for returning unused energy from the load back to said means for producing pulsed voltage;

a load matching circuit;

means for inhibiting load voltage discharge back through the circuit; and means for transferring energy from said means for producing pulsed voltage to said load matching circuit.

2. The circuit of claim 1 further comprising a transformer for stepping up voltage from said means for producing pulsed voltage to said load matching circuit.

3. The circuit of claim 1 wherein said means for producing pulsed voltage comprises at least one circuit selected from the group of circuits consisting of inversion circuits and high voltage switching circuits.

4. The circuit of claim 3 wherein said inversion circuit comprises:

at least one inversion circuit storage capacitor to be charged by said means for charging;

a primary switch to be closed when said at least one inversion circuit storage capacitor becomes charged; and an inversion circuit inductor in series with said primary switch.

5. The circuit of claim 3 wherein said high voltage switching circuit comprises:

a primary switch;

a switching circuit inductor in series with said primary switch; and at least one switching circuit primary storage capacitor for triggering said primary switch, and located in series between said switching circuit inductor and said at least one magnetic switch stage.

6. The circuit of claim 1 wherein said energy recovery circuit comprises:

at least one energy recovery diode; and an energy recovery inductor in series with at least one of said at least one energy recovery diodes.

7. The circuit of claim 6 wherein said energy recovery circuit further comprises:

at least one energy recovery storage capacitor at the output of said means for charging said means for producing pulsed voltage;

at least one series charge element at the output of said means for charging said means for producing pulsed voltage; and at least one energy recovery diode to recover energy due to voltage reversals occurring in said load matching circuit.

8. The circuit of claim 1 wherein said load matching circuit comprises:

at least one load matching blocking diode; and at least one load matching capacitor for charging the load.

9. The circuit of claim 1 wherein said means for inhibiting load voltage discharge comprises at least one blocking diode.

10. The circuit of claim 1 wherein said means for transferring energy comprises at least one magnetic switch stage.

11. The circuit of claim 10 wherein said at least one magnetic switch stage comprises:

at least one magnetic switch; and at least one capacitor to saturate each of said at least one magnetic switch.

12. The circuit of claim 1 further comprising a fire-on voltage controller for determining the trigger voltage for said means for producing pulsed voltage.

13. A circuit for generating slow rise-time, high voltage electrical pulses to a load, said circuit comprising:

means for producing pulsed voltage;

means for charging said means for producing pulsed voltage;

at least one blocking diode to inhibit load voltage discharge back through the circuit; and at least one magnetic switch stage for transferring energy from said means for producing pulsed voltage to the load.

14. The circuit of claim 13 wherein said means for producing pulsed voltage comprises:

at least one storage capacitor to be charged to a preset voltage; and a primary switch to be closed when said at least one storage capacitor becomes charged to the preset voltage.

15. The circuit of claim 14 further comprising a fire-on voltage controller for determining said preset voltage for said storage capacitor.

16. The circuit of claim 13 further comprising:

an inductor in series with said means for producing pulsed voltage; and at least one capacitor to transfer energy from said means for producing pulsed voltage to said at least one magnetic switch stage and load.

17. In an electrostatic precipitator system having a high voltage power source, an improvement comprising:

means for producing pulsed voltage connected to said power source;

an energy recovery circuit for returning unused energy from the electrostatic precipitator back to the means for producing pulsed voltage;

a load matching circuit connected between the means for producing pulsed voltage and the electrostatic precipitator;

means for inhibiting the electrostatic precipitator load voltage discharge back through the system; and means for transferring energy from said means for producing pulsed voltage to said load matching circuit.

18. A method of generating slow rise-time, high voltage electrical pulses to a load, the method comprising the steps of:

a) producing pulsed voltage;

b) transferring energy from the means for producing pulsed voltage to the load;

c) matching the load to the means for producing pulsed voltage;

d) blocking the load voltage to inhibit discharge back through the pulse generating circuit; and e) recovering and returning unused energy from the load back to the means for producing pulsed voltage.

19. The method of claim 18 further comprising the step of stepping up voltage from the means for producing pulsed voltage to the load with a transformer.

20. The method of claim 18 wherein the step of producing pulsed voltage comprises the steps of:

a) charging at least one inversion circuit storage capacitor with charging means; and b) closing a primary switch when the at least one inversion circuit storage capacitor becomes charged.

21. The method of claim 18 wherein the step of producing pulsed voltage comprises the steps of:

a) charging at least one high voltage switching circuit storage capacitor located in series between a switching circuit inductor and at least one magnetic switch stage; and b) closing a primary switch when the at least one high voltage switching circuit storage capacitor becomes charged.

22. The method of claim 18 wherein the step of recovering and returning unused energy from the load comprises the step of recovering unused energy from the load with at least one energy recovery diode and an energy recovery inductor in series with the at least one energy recovery diode.

23. The method of claim 22 further comprising the steps of:

a) recovering unused energy from the load with at least one energy recovery storage capacitor and at least one series charge element, both placed at the output of the means for charging the means for producing pulsed voltage; and b) recovering energy due to voltage reversals occurring in the load matching circuit with at least one energy recovery diode.

24. The method of claim 18 wherein the step of matching the load to the means for producing pulsed voltage comprises matching the load with at least one load matching blocking diode and at least one load matching capacitor that charges the load.

25. The method of claim 18 wherein the step of transferring energy from the means for producing pulsed voltage to the load comprises the steps of:

a) saturating at least one magnetic switch stage with a charged capacitor; and b) transferring energy from the means for producing pulsed voltage to the load with the at least one magnetic switch stage.

26. The method of claim 18 further comprising the step of controlling the trigger voltage for producing pulsed voltage, with a fire-on voltage controller.

27. A method of generating slow rise-time, high voltage electrical pulses to a load, the method comprising the steps of:

a) producing pulsed voltage;

b) charging the means for producing pulsed voltage;

c) blocking the load voltage to inhibit discharge back through the pulse generating circuit; and d) transferring energy from the means for producing pulsed voltage to the load with at least one magnetic switch stage.

28. The method of claim 27 wherein the step of producing pulsed voltage comprises the steps of:

a) charging at least one storage capacitor to a preset voltage; and b) closing a primary switch when the at least one storage capacitor becomes charged to the preset voltage.

29. The method of claim 28 further comprising the step of controlling the trigger voltage for closing the primary switch with a fire-on voltage controller.

* * * * *